(12) United States Patent
Yokota et al.

(10) Patent No.: US 8,140,675 B2
(45) Date of Patent: Mar. 20, 2012

(54) CONTENT REPRODUCTION APPARATUS

(75) Inventors: Kaoru Yokota, Ashiya (JP); Motoji Ohmori, Hirakata (JP); Koichi Morioka, Katano (JP); Hideshi Ishihara, Katano (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 10/580,178

(22) PCT Filed: Dec. 20, 2004

(86) PCT No.: PCT/JP2004/019479
§ 371 (c)(1),
(2), (4) Date: May 22, 2006

(87) PCT Pub. No.: WO2005/069294
PCT Pub. Date: Jul. 28, 2005

(65) Prior Publication Data
US 2007/0092081 A1    Apr. 26, 2007

(30) Foreign Application Priority Data

Jan. 15, 2004    (JP) ................................ 2004-007683

(51) Int. Cl.
*G06F 15/173* (2006.01)

(52) U.S. Cl. .................. 709/225; 380/258; 380/281

(58) Field of Classification Search .......... 709/223–226; 380/277–286
See application file for complete search history.

(56) References Cited

U.S. PATENT DOCUMENTS

| 6,058,187 | A  | * | 5/2000 | Chen ............................ 713/170 |
| 6,256,391 | B1 |   | 7/2001 | Ishiguro et al. |
| 6,944,763 | B1 | * | 9/2005 | Asano et al. .................. 713/168 |
| 7,142,692 | B2 |   | 11/2006 | Arimura et al. |

(Continued)

FOREIGN PATENT DOCUMENTS

CN          1455891         11/2003

(Continued)

OTHER PUBLICATIONS

Seiji Okuaki et al., "Proposal of a Hybrid System Combining Complete Subtree Method and Subset Difference Method," SCIS 2003, The 2003 Symposium on Cryptography and Information Security, Hamamatsu, Japan, Jan. 26-29, 2003, The Institute of Electronics, Information and Communication Engineers, pp. 221-226 (with English translation).

(Continued)

*Primary Examiner* — Ian N Moore
*Assistant Examiner* — Jackie Zuniga
(74) *Attorney, Agent, or Firm* — Wenderoth, Lind & Ponack, L.L.P.

(57) ABSTRACT

A content reproduction apparatus (1) which reproduces digital contents, and includes a device key storage unit (110) holding a device key (110a) specific to the content reproduction apparatus (1) in a manner that does not allow access from outside the content reproduction apparatus (1). The content reproduction apparatus (1), also includes a device ID storage unit (19) holding device key index information (19a) that is in a one-to-one association with a device key (110a), an instruction code receiving unit (14a) receiving an instruction code to output index information, a device key index information obtainment processing unit (10a) outputting, to outside, the device key index information (19a) stored in the device ID storage unit (19) based on the instruction, and a device key index information output processing unit (11a).

12 Claims, 14 Drawing Sheets

U.S. PATENT DOCUMENTS

| | | | |
|---|---|---|---|
| 7,233,665 B1 | 6/2007 | Ishiguro et al. | |
| 7,373,506 B2 | 5/2008 | Asano et al. | |
| 7,669,052 B2 | 2/2010 | Asano et al. | |
| 2001/0021255 A1* | 9/2001 | Ishibashi | 380/277 |
| 2002/0076082 A1 | 6/2002 | Arimura et al. | |
| 2002/0120722 A1 | 8/2002 | Kutaragi et al. | |
| 2002/0169971 A1 | 11/2002 | Asano et al. | |
| 2003/0081792 A1* | 5/2003 | Nakano et al. | 380/286 |
| 2003/0233559 A1 | 12/2003 | Asano et al. | |
| 2004/0030902 A1* | 2/2004 | Asano et al. | 713/176 |
| 2004/0128252 A1* | 7/2004 | Shirai et al. | 705/59 |
| 2004/0133794 A1* | 7/2004 | Kocher et al. | 713/193 |
| 2006/0227973 A1* | 10/2006 | Takashima et al. | 380/277 |
| 2007/0088961 A1 | 4/2007 | Asano et al. | |
| 2007/0136612 A1 | 6/2007 | Asano et al. | |
| 2007/0140484 A1 | 6/2007 | Ishiguro et al. | |
| 2008/0098118 A1 | 4/2008 | Kutaragi et al. | |
| 2010/0005301 A1 | 1/2010 | Asano et al. | |

FOREIGN PATENT DOCUMENTS

| | | |
|---|---|---|
| JP | 2001-265581 | 9/2001 |
| JP | 2002-152194 | 5/2002 |
| JP | 2003-037590 | 2/2003 |
| JP | 2003-153227 | 5/2003 |
| JP | 2003-204320 | 7/2003 |
| TW | 379308 | 4/1987 |
| TW | 538636 | 8/1990 |
| TW | 514843 | 10/1991 |
| WO | 03/017273 | 2/2003 |

OTHER PUBLICATIONS

Intel Corporation et al., "Content Protection for Recordable Media Specification: DVD Book, Revision 0.94," publication, Oct. 18, 2000, XP002167964, pp. 2-1.

F. A. Stevenson, "Cryptanalysis of Contents Scrambling System," Publication, Nov. 8, 1999, XP002295619, 4 pages.

Liu Jianwei et al., "A User Authentication Protocol for Digital Mobile Communication Network", Personal, Indoor and Mobile Radio Communications, 1995, PIMRC '95, Wireless: Merging onto the Information Superhighway, Sixth IEEE International Symposium on Toronto, Ont., Canada Sep. 27-29, 1995, New York, NY, USA, IEEE, US, vol. 2, Sep. 27, 1995, pp. 608-612, XP010150958, ISBN: 0-7803-3002-1.

Intel Corporation et al., "Content Protection for Recordable Media Specification: Introduction and Common Cryptographic Elements, Revision 1.0," publication, Jan. 17, 2003.

* cited by examiner

CONTENT REPRODUCTION APPARATUS

BACKGROUND OF THE INVENTION

1. Field of the Invention

The present invention relates to a content reproduction apparatus, in particular to a content reproduction apparatus which reproduces digital contents.

2. Description of the Related Art

Under a digital content copyright protection method for a recording media, such as an optical disc equivalent to a Digital Versatile Disc (DVD), a Secure Digital (SD) memory card, and a semiconductor recording media such as a memory stick, contents are encrypted and recorded in the media. The encrypted contents are decrypted with a key embedded in a content reproduction apparatus and reproduced. Under a license agreement with a licensor, the licensor gives a license for use of the copyright protection method, a manufacturer of manufacturing a content reproduction apparatus receives a key necessary for decrypting the contents (hereafter referred to as "device key") with a license of manufacturing a content reproduction apparatus.

The license agreement includes security implementation specifications (compliance rule, robustness rule). The following implementation conditions are enforced to the licensed manufacturer: (i) to implement the received device key in the content reproduction apparatus in a format in which a certain level of security standard is satisfied; (ii) not to output content data in plaintext decrypted in the content reproduction apparatus to outside of the content reproduction apparatus via a general external interface; and (iii) not to output the content data to an user accessible bus in the content reproduction apparatus.

In compliance with the security implementation specifications by the mechanism and agreement of the content encryption using a device key, the contents recorded in the media can be prevented from, without permission, being copied to a hard disc and other recording media and being distributed to the Internet.

However, the mechanism only cannot resist to the threat caused in the case where the protection implementation applied when the manufacturer embedded the device key in the content reproduction apparatus and the device key is disclosed. That is, an analyzer who disclosed the device key can generate and circulate an unauthorized copying tool so as to decrypt an encrypted content and copy on a hard disc based on the device key (i.e., ignoring the security implementation specifications). However, the content encryption mechanism only cannot prevent the malpractices by such analyzer.

Accordingly, a key revocation technique has been introduced to many copyright protection methods as a countermeasure against the disclosure of the device key. As a specific method of key revocation, for example, there is a method disclosed in Intel Corporation et al., "Content Protection for Recordable Media Specification, Introduction and Common Cryptographic Elements," Revision 1.0, Jan. 17, 2003 (hereafter referred to as "relevant literature"). In this key revocation method, a unique device key is given to each content reproduction apparatus. Also, index information for identifying a device key (hereafter referred to as "device key index information") is assigned to each device key and given to each content reproduction apparatus with the device key. The content reproduction apparatus can decrypt the encrypted content based on the device key and the attached device key index information.

Using this key revocation technique, even if a device key is disclosed, the device key can be revoked so that the revoked device key cannot decrypt contents to be written in a recording media manufactured after the revocation or contents recorded in the recorded media manufactured after the revocation. Whereas the detail about the technique is disclosed in the relevant literature, further explanation is not provided in here. Thus, the key revocation technique can embed a unique device key in each content reproduction apparatus and separately revoke the disclosed device key.

However, in the key revocation technique, it is necessary to embed a unique device key in each content reproduction apparatus. Also, the manufacturer has to work so that device keys cannot be read out from outside based on the conditions in the license agreement. This is very inconvenient for the content reproduction apparatus manufacturer. Because, in the case of receiving a repair request of the content reproduction apparatus due to operation malfunction from an end user, it is necessary to know details of the device key embedded in the content reproduction apparatus in order to specify a malfunctioned part, in particular to judge whether or not the malfunction is occurring in the decryption processing unit. For example, under a circumstance where some device keys are actually revoked, it is necessary to know details of the device key in order to judge whether the content reproduction apparatus requested to be repaired is a content reproduction apparatus in which a revoked device key is embedded. However, since the details of the device key cannot be known as described above, it is a problem that whether or not the device key embedded in the content reproduction apparatus is revoked cannot be known.

On the other hand, there is a following problem in another perspective. It is necessary to use a device key unique to each content reproduction apparatus. Also, a licensor of the copyright protection method needs to verify anytime about whether the manufacturer of the content reproduction apparatus as a licensee is not performing a malpractice such as embedding same device key into a plurality of content reproduction apparatuses ignoring the license agreement. In order to fulfill this necessity, in the present circumstance, the device key is implemented so as not to be read out from the content reproduction apparatus. Therefore, there is a problem that the licensor of the copyright protection method cannot verify whether or not the same device key is embedded in the plurality of content reproduction apparatuses.

In order to resolve above mentioned problems, an object of the present invention is to provide a content reproduction apparatus which can tell whether or not a device key embedded in a content reproduction apparatus is revoked or not.

Further, another object is to provide a content reproduction apparatus which can verify whether the same device key is embedded in the plurality of content reproduction apparatuses.

BRIEF DISCLOSURE OF INVENTION

A content reproduction apparatus according to an aspect of the present invention is a content reproduction apparatus which reproduces digital contents, comprising: a secret information storage unit operable to hold secret information specific to the content reproduction apparatus in a manner which does not allow access from outside the content reproduction apparatus; an index information storage unit operable to hold index information which is in a one-to-one association with the secret information; an instruction receiving unit operable to receive an instruction to output the index information; and an index information output unit operable to output the index information stored in the index information storage unit to outside based on the instruction.

According to this structure, the content reproduction apparatus can output the index information which is in a one-to-one association with the secret information. Therefore, even after the content reproduction apparatus is shipped as a product, it is possible to verify, to which content reproduction apparatus, that the secret information (device key) embedded in the content reproduction apparatus is specific.

Consequently, by examining the displayed index information, personnel of the manufacturer of the content reproduction apparatus and a licensor of the secret information and the index information can know about which secret information (device key) is embedded in the content reproduction apparatus. Therefore, the personnel of the content reproduction apparatus manufacturer can know whether or not the secret information (device key) embedded in the content reproduction apparatus is revoked or not by examining the index information.

Also, the licensor can verify whether the same secret information (device key) is embedded in the plurality of the content reproduction apparatuses by examining whether or not the same index information is used in the plurality of the content reproduction apparatuses.

Further, the index information stored in the index information storage unit is encrypted according to a predetermined cryptographic method, and the index information output unit may output, based on the instruction, the encrypted index information stored in the index information storage unit to outside.

Even if the index information is encrypted, the same index information encrypted with the same key has a same value. Therefore, the licensor of the secret information can verify whether or not the same secret information (device key) is embedded in the plurality of the content reproduction apparatuses by examining whether or not the same index information is used in the plurality of the content reproduction apparatuses.

Preferably, the content reproduction apparatus further comprises an authentication data storage unit operable to hold authentication data that is obtained by performing a predetermined conversion on the index information.

If the licensor only can know the predetermined conversion, a malpractice by a licensee of the secret information and the index information to output dummy index information from the content reproduction apparatus is prevented by examining whether or not the result by which the predetermined conversion is performed on the index information outputted from the content reproduction apparatus matches with the authentication data stored in the authentication data storage unit.

Also, the instruction receiving unit may read a program for executing the instruction from a removable recording medium on which the program is recorded, and the index information output unit may output the index information stored in the index information storage unit to outside, by executing the read program.

According to this structure, a disc reading unit which is previously placed in an ordinary content reproduction apparatus and a video output interface to outside can be used. Therefore, basically, the amount of costs required for adding a function to the ordinary content reproduction apparatus is small.

Further, on the recording medium, a unique identification number is recorded, the instruction receiving unit reads the program and the identification number from the removable recording medium on which the program is recorded, and the index information output unit may output, to outside, the index information stored in the index information storage unit, by executing the read program only when the identification number satisfies a predetermined condition.

According to this structure, only when a recording medium having a specific identification number is placed, the content reproduction apparatus can execute the program. The recording medium having the specific identification number is not commercially available so that only the development manufacturer of the content reproduction apparatus can obtain the recording medium. Therefore, even if a general user can create a program for displaying the index information, the user cannot obtain the disc for maintenance. Consequently, the index information in the content reproduction apparatus cannot be browsed.

Even if the program stored in the recording medium for maintenance is copied, the identification number of the recording medium differs with the identification number of a recording medium at a destination of the copying. Also, the identification number of the recording medium at the copying destination does not have authority to execute the program. Therefore, the content reproduction apparatus can make the program unavailable.

Furthermore, the instruction receiving unit may be a communication terminal connected to a computer network.

According to this structure, in the case where a DVD recorder having a communication interface for updating Electric Program Guide (EPG) information and reserving a video recording via a network is used as the content reproduction apparatus, it is not necessary to set an interface specific for obtaining the index information, by using the communication interface (I/F).

Also, the instruction receiving unit may be a debug terminal used for connecting a debug apparatus to the content reproduction apparatus, the debug apparatus being used during development of the content reproduction apparatus.

According to this structure, the index information can be displayed to the debug apparatus using a debug interface for developing the content reproduction apparatus. Therefore, it is not necessary to set an interface specific for obtaining the index information.

Also, it can prevent the debug apparatus for developing the content reproduction apparatus and the general user without debug environment from browsing the index information without authorization.

A content reproduction apparatus according to one of the other aspects of the present invention is a content reproduction apparatus which reproduces digital contents, comprising: a secret information storage unit operable to hold secret information specific to the content reproduction apparatus in a manner which does not allow access from outside the content reproduction apparatus; an index information storage unit operable to hold index information which is in a one-to-one association with the secret information; and a display unit operable to display the index information.

According to this structure, the index information, which is in a one-to-one association with the secret information, can be easily known. Therefore, even after the content reproduction apparatus is shipped as a product, it is possible to verify, to which content reproduction apparatus, that the secret information (device key) embedded in the content reproduction apparatus is specific.

Consequently, by examining the displayed index information, personnel of the manufacturer of the content reproduction apparatus and a licensor of the secret information and the index information can know about which secret information (device key) is embedded in the content reproduction apparatus. Therefore, the personnel of the content reproduction apparatus manufacturer can know whether or not the secret information (device key) embedded in the content reproduction apparatus is revoked or not by examining the index information.

Also, the licensor can verify whether the same secret information (device key) is embedded in the plurality of the content reproduction apparatuses by examining whether or not the same index information is used in the plurality of the content reproduction apparatuses.

Further, the index information stored in the index information storage unit may be encrypted according to a predetermined cryptographic method, and a display unit may display the encrypted index information.

Even if the index information is encrypted, the same index information encrypted with the same key has a same value. Therefore, the licensor of the secret information can verify whether or not the same secret information (device key) is embedded in the plurality of the content reproduction apparatuses by examining whether or not the same index information is used in the plurality of the content reproduction apparatuses.

Further, a content reproduction system according to another aspect of the present invention is a content reproduction system which reproduces digital contents, comprising: a content reproduction apparatus which reproduces the digital contents; and a user authentication server which performs user authentication, wherein the content reproduction apparatus includes: a secret information storage unit operable to hold secret information specific to the content reproduction apparatus in a manner which does not allow access from outside of the content reproduction apparatus; an index information storage unit operable to hold index information which is in a one-to-one association with the secret information; a user identification information transmission unit operable to transmit user identification information to the user authentication server; an instruction receiving unit operable to receive an instruction to output the index information; and an index information output unit operable to output, based on the instruction, the index information stored in the index information storage unit. Further, the user authentication server includes: a user authentication unit operable to perform user authentication based on the user identification information received from the content reproduction apparatus; and an instruction transmission unit operable to transmit an instruction to output the index information to the content reproduction apparatus, based on a result of the authentication performed by the user authentication unit.

According to this structure, the content reproduction apparatus can output the index information which is in a one-to-one association with the secret information. Therefore, even after the content reproduction apparatus is shipped as a product, it is possible to verify, to which content reproduction apparatus, that the secret information (device key) embedded in the content reproduction apparatus is specific.

Consequently, by examining the displayed index information, personnel of the manufacturer of the content reproduction apparatus and a licensor of the secret information and the index information can know about which secret information (device key) is embedded in the content reproduction apparatus. Therefore, the personnel of the content reproduction apparatus manufacturer can know whether or not the secret information (device key) embedded in the content reproduction apparatus is revoked or not by examining the index information.

Also, the licensor can verify whether the same secret information (device key) is embedded in the plurality of the content reproduction apparatuses by examining whether or not the same index information is used in the plurality of the content reproduction apparatuses.

Further, in the case where a DVD recorder having a communication interface for updating Electric Program Guide (EPG) information and reserving a video recording via a network is used as the content reproduction apparatus, it is not necessary to set an interface specific for obtaining the index information, by using the communication interface (I/F).

Furthermore, a user authentication server performs user authentication of an operator of the content reproduction apparatus. Therefore, it can prevent the operator without authority from browsing the index information without authorization.

Note that, the present invention can be implemented not only as a content reproduction apparatus having such characteristic units and a content reproduction system, but also as a content reproduction method including the characteristic units included in the content reproduction apparatus as steps, and as a program for causing a computer to execute the steps included in the content reproduction method. Here, it is needless to say that such program can be distributed via a recording medium such as a CD-ROM and a communication network such as the Internet.

According to a method of verifying the content reproduction apparatus specific information by the present invention, it is possible to verify what type of device key is embedded in the content reproduction apparatus even after the device key specific to the content reproduction apparatus is installed in a manner which the device key cannot be read from outside.

Consequently, the present invention can provide a content reproduction apparatus which can tell whether the device key embedded in the content reproduction apparatus is revoked or not.

Furthermore, the present invention can provide a content reproduction apparatus which can verify whether or not the same device key is embedded in the plurality of the content reproduction apparatuses.

As further information about technical background to this application, the disclosure of Japanese Patent Application No. 2004-007683 filed on Jan. 15, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

Hereafter, it is explained about embodiments of the present invention with reference to drawings. In the embodiments explained hereafter, a content reproduction system which obtains device key index information embedded in a content reproduction apparatus is explained.

First Embodiment

Figure 1:
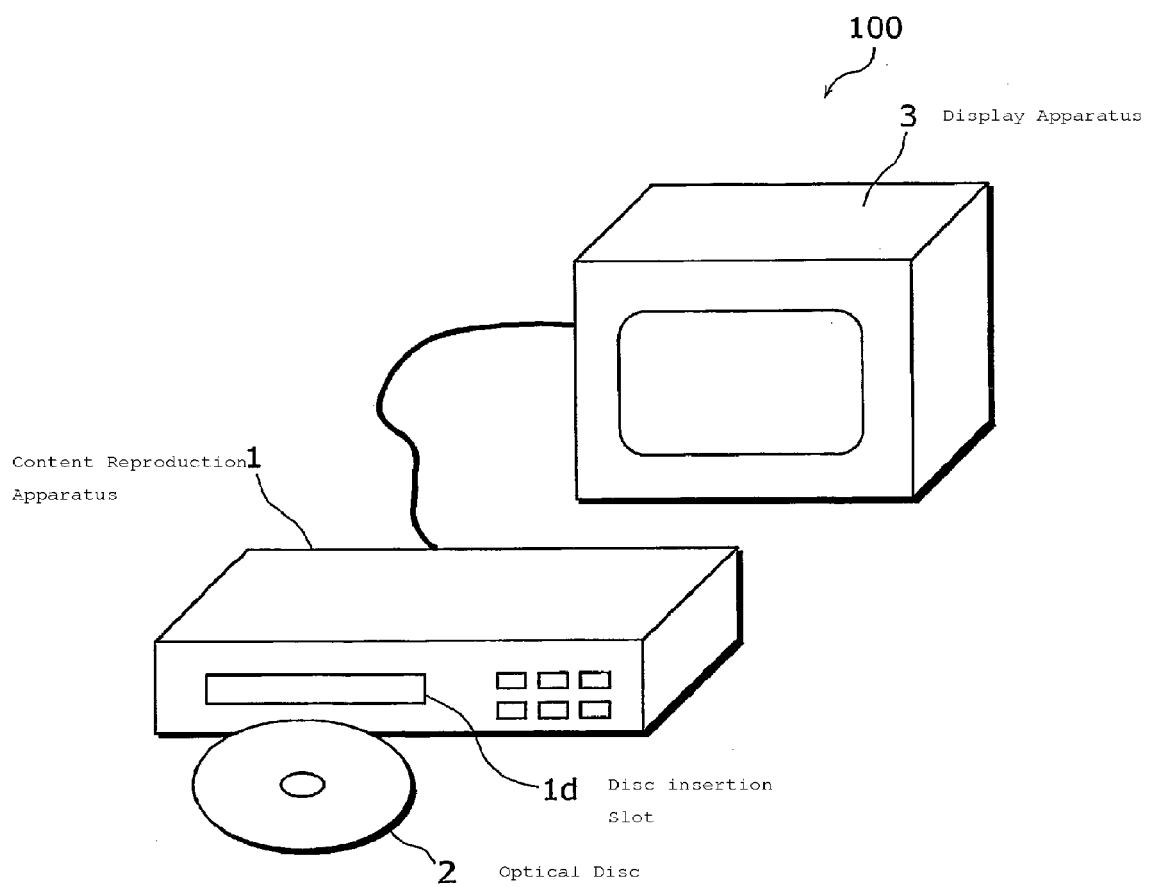
FIG. 1 is an outside drawing showing a structure of a content reproduction system according to a first embodiment of the present invention.

FIG. 1 is an outside drawing showing a structure of a content reproduction system 100 according to a first embodiment of the present invention.

The content reproduction system 100 is a system not only for reproducing digital contents, but also for displaying device key index information stored in a content reproduction apparatus. It includes a content reproduction apparatus 1, a display apparatus 3 and an optical disc 2.

The content reproduction apparatus 1 is an apparatus which decrypts and reproduces a digital content encrypted using a device key and device key index information attached to and associated in one to one with the device key. The device key and the device key index information are embedded and stored in the content reproduction apparatus 1.

The display apparatus 3 is an apparatus which displays video data outputted from the content reproduction apparatus 1 on a screen.

The optical disc 2 is a recording medium in which a program for displaying details of the device key index information embedded in the content reproduction apparatus 1 to the display apparatus 3.

Here, as an example of the content reproduction apparatus 1, there are a DVD player, a DVD recorder, a Blu-ray Disc (BD) recorder and the like. Also, as an example of the optical disc 2, there are a DVD, a BD, a CD and the like. Further, the content reproduction apparatus 1 and the display apparatus 3 have an interface for inputting and outputting video. As the interface for video input/output, an RGB terminal, a video terminal, an S terminal, a D terminal and the like are designed and the content reproduction apparatus 1 and the display apparatus 3 are connected to each other via a connection cable in accordance with each of the terminals.

Figure 2:
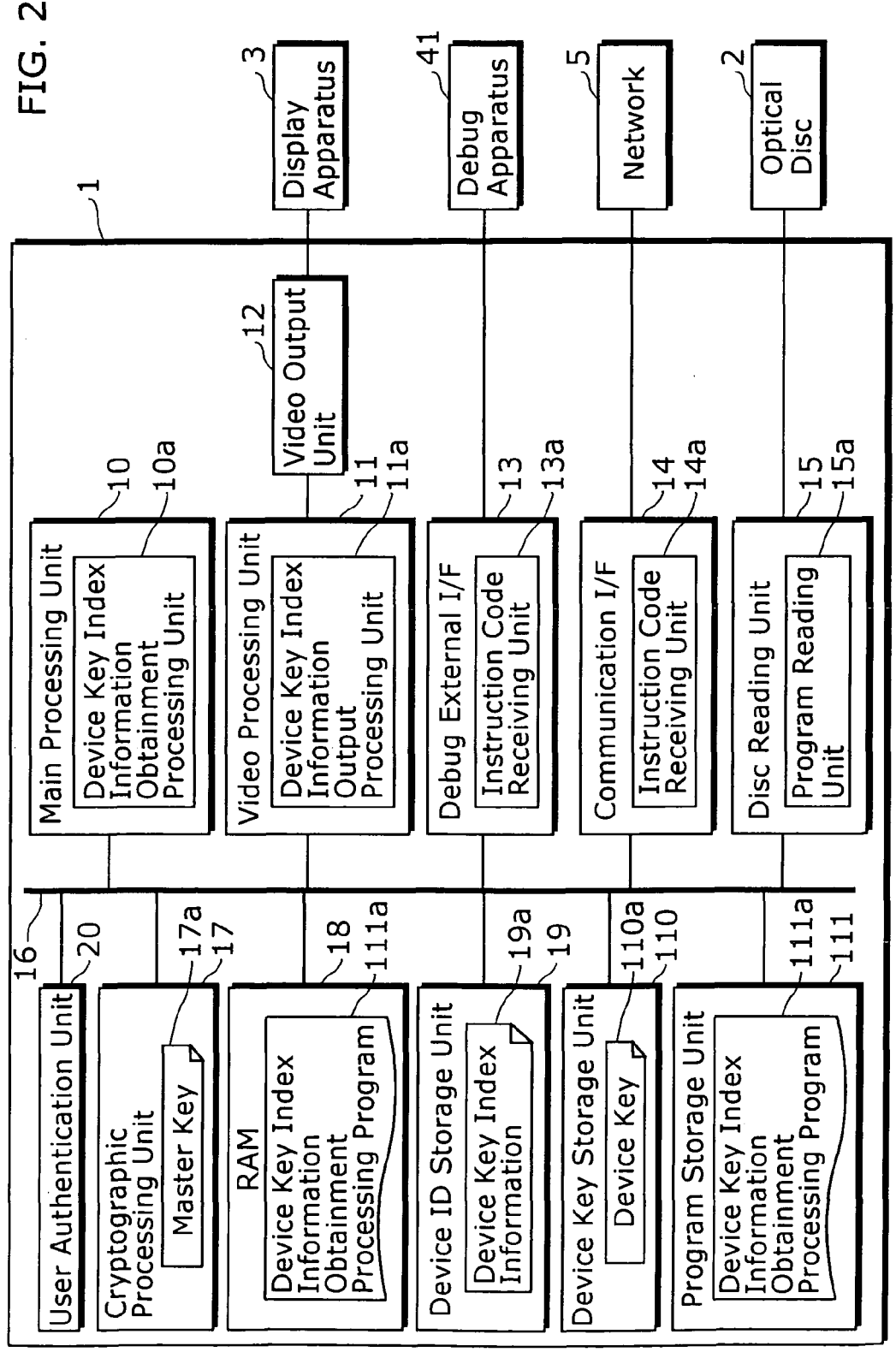
FIG. 2 is a block diagram showing an internal structure of the content reproduction apparatus.

FIG. 2 is a block diagram showing an internal configuration of the content reproduction apparatus 1 according to the present embodiment.

As described above, the content reproduction apparatus 1 is an apparatus which decrypts and reproduces an encrypted digital content. It includes a main processing unit 10, a video processing unit 11, a video output unit 12, a debug external interface (I/F) 13, a communication I/F 14, a disc reading unit 15, cryptographic processing unit 17, a RAM 18, a device ID storage unit 19, a device key storage unit 110, a program storage unit 111, a user authentication unit 20, and a data bus 16.

The main processing unit 10 is a processing unit which controls each processing unit included in the content reproduction apparatus 1, inputting and outputting of each interface, and reading and writing data from each storage unit. The main processing unit 10 includes a device key index information obtainment processing unit 10a. The device key index information obtainment processing unit 10a is a processing unit for obtaining device key index information 19a stored in the device ID storage unit 19 explained hereafter.

The video processing unit 11 is a processing unit which creates data for screen display by which the display apparatus 3 converts data processed in the content reproduction apparatus 1 into a data format which can be displayed on a screen. The video processing unit 11 includes a device key index information output processing unit 11a which outputs the device key index information 19a obtained by the device key index information obtainment processing unit 10a via the video output unit 12.

The video output unit 12 is a processing unit which outputs the data for screen display to the display apparatus 3. As the video output unit 12, an RGB terminal, a video terminal, a S terminal, a D terminal and the like are envisioned.

The debug external I/F 13 is a data input/output interface between a debug device (apparatus) 41 which is explained in a second embodiment and the content reproduction apparatus 1. As the debug external I/F 13, a Joint Test Action Group (JTAG) terminal and the like are envisioned. The debug external I/F 13 includes an instruction code receiving unit 13a which receives an instruction code which received from the debug device 41.

The communication I/F 14 is a communication interface for connecting the content reproduction apparatus 1 to an external network such as a Local Area Network (LAN) explained in third and fourth embodiments. As the communication I/F 14, a LAN terminal and the like is envisioned. The communication I/F 14 includes an instruction code receiving unit 14a which receives an instruction code via a network 5.

The disc reading unit 15 is a processing unit which reads data recorded on an optimal disc inserted into the content reproduction apparatus 1 and writes data onto the optical disc. The disc reading unit 15 includes a program reading unit 15a which reads a program stored in the optical disc 2 and transfers to the main processing unit 10.

The cryptographic processing unit 17 is a processing unit which performs cryptography (encryption and/or decryption) necessary for reproducing content.

The RAM 18 is a recording apparatus which temporally holds a program and processing data in the content reproduction apparatus 1.

The device ID storage unit 19 is a storage apparatus which holds the device key index information 19a attached to the device key embedded in the content reproduction apparatus 1.

The device key storage unit 110 is a storage unit which holds a device key 110a.

The program storage unit 111 is a storage unit which holds a program for obtaining device key index information (device key index information obtainment processing program 111a) executed by the device key index information obtainment processing unit 10a.

As will be explained in the third embodiment, the user authentication unit 20 is a processing unit which requests for connection to a server (not shown in the diagram) connected via the network 5.

The data bus 16 is an internal data bus for mutually connecting modules other than the video output unit 12 each other and transferring data among modules.

The device key index information 19a and the device key 110a are encrypted by a predetermined cryptographic method such as a Data Encryption Standard (DES) encryption and stored respectively in the device ID storage unit 19 and the device key storage unit 110. A key used for encrypting the device key index information 19a and the device key 110a (master key 17a) are stored in the encryption processing unit 17 so as not to be read out from outside of the content reproduction apparatus.

The program storage unit 111 holds a program for performing a process in the content reproduction apparatus 1. This program includes the device key index information obtainment processing program 111a in which a process for outputting the device key index information 19a to the outside according to an external instruction is described. Also, these programs are compressed in data and recorded in the program recording unit 111, decompressed in data when the content reproduction apparatus 1 is powered and transferred to the RAM 18.

Next, in the content reproduction system 100 according to the present embodiment, it is explained about a process of outputting the device key index information 19a recorded in the content reproduction apparatus 1 to the outside.

Figure 3:
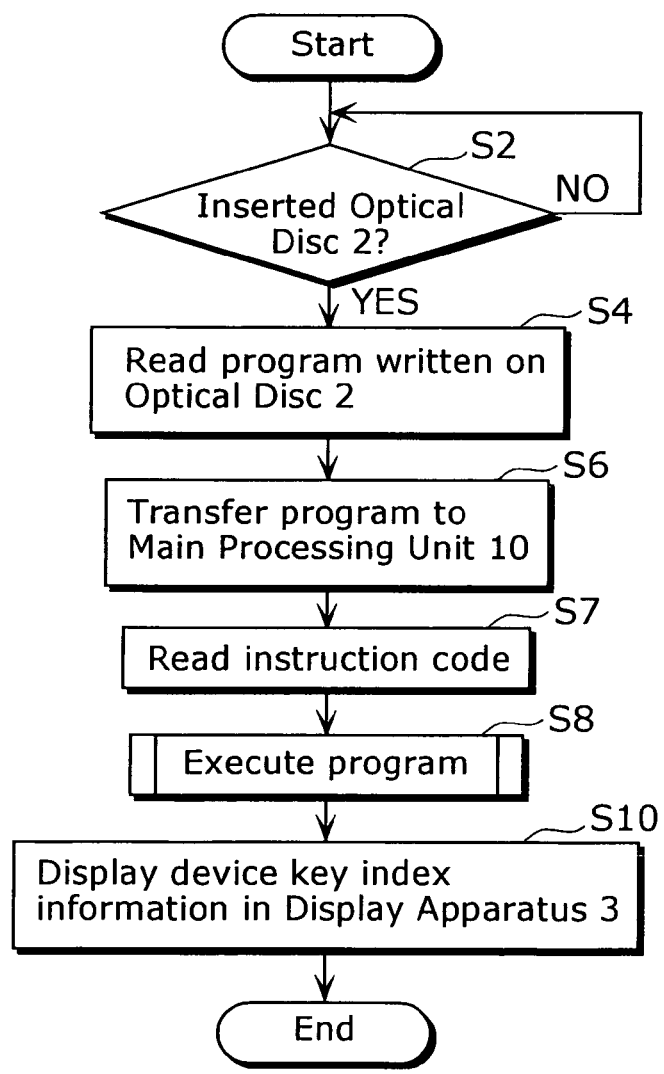
FIG. 3 is a flowchart showing a process executed by the content reproduction apparatus.

FIG. 3 is a flowchart showing a process executed by the content reproduction apparatus 1.

As shown in FIG. 1, a user inserts, into a disc insertion slot 1d of the content reproduction apparatus 1, the optical disc 2 in which a program for displaying the device key index information 19a is stored.

The disc reading unit 15 shown in FIG. 2 judges whether or not the optical disc 2 is inserted into the disc insertion slot 1d (S2). After the optical disc 2 is inserted to the disc insertion unit 1d (YES at S2), the program reading unit 15a reads the program written on the optical disc 2 (S4). The program reading unit 15a transfers the read program to the device key index information obtainment processing unit 10a of the main processing unit 10 via the data bus 16 (S6).

The device key index information obtainment processing unit 10a reads an instruction code for outputting the device key index information 19a included in the read program (S7). The device key index information obtainment processing unit 10a executes, according to the instruction code, a device key index information obtainment processing program 111a stored in the RAM 18 (S8). It is explained later about details of the process executed by the device key index information obtainment processing unit 10a (S8).

The device key index information output processing unit 11a converts the device key index information 19a obtained by the process (S8) into a data format which can be displayed by the display apparatus 3 in the video processing unit 11. After that, it displays the converted device key index information 19a to the display apparatus 3 via a connection cable (not shown in a diagram) connecting it to the video output unit 12 and the display apparatus 3 (S10).

Figure 4:
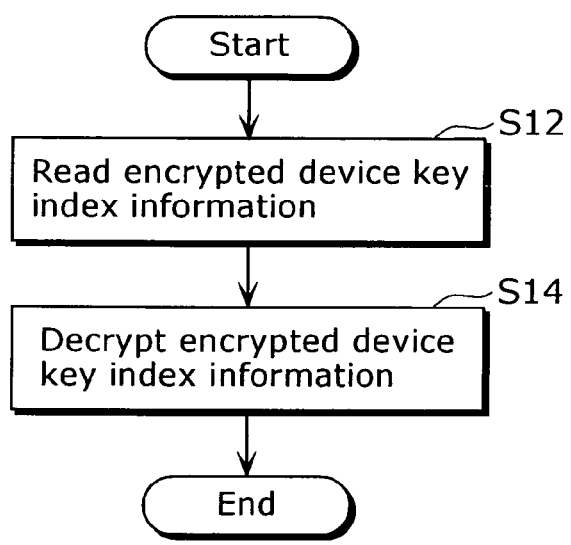
FIG. 4 is a flowchart showing details of a device key index information obtainment process (S8 in FIG. 3).

Next, it is explained about details of the process (S8) executed by the device key index information obtainment processing unit 10a. FIG. 4 is a flowchart showing details of the process (S8 in FIG. 3).

The device key index information obtainment processing unit 10a reads encrypted device key index information stored in the device ID storage unit 19 (hereafter referred to as "encrypted device key index information") and outputs to the cryptographic processing unit 17 (S12). The cryptographic processing unit 17 decrypts the encrypted device key index information using the master key 17a (S14).

Through the above mentioned process, the device key index information 19a is displayed to the display apparatus 3. Accordingly, personnel from the manufacturer of the content reproduction apparatus and the licensor can know about which device key 110a is embedded in the content reproduction apparatus 1 by examining the displayed device key index information 19a.

Therefore, the personnel from the content reproduction apparatus manufacturer can know about whether the device key embedded in the content reproduction apparatus 1 is revoked or not by examining the device key index information 19a.

Also, the licensor can verify whether the same device key 110a is embedded in the plurality of content reproduction apparatuses 1 or not by examining whether the same device key index information 19a is used in the plurality of content reproduction apparatuses 1 or not.

Here, the following is an effect specific to the first embodiment. That is, according to the content reproduction system 100 in the first embodiment, the disc reading unit 15 which has been implemented in the content reproduction apparatus 1 and a video output interface to the outside (the video processing unit 11 and the video output unit 12) can be used. Therefore, it is basically needed only to add the device key index information obtainment processing program 111a for outputting the device key index information 19a to the content reproduction apparatus 1 so that costs for adding functions remain less.

Second Embodiment

A content reproduction system according to the second embodiment of the present invention differs with the content reproduction system 100 according to the first embodiment. Other than reproducing digital contents, it displays the device key index information 19a stored in the content reproduction apparatus to the debug apparatus which is described later.

Figure 5:
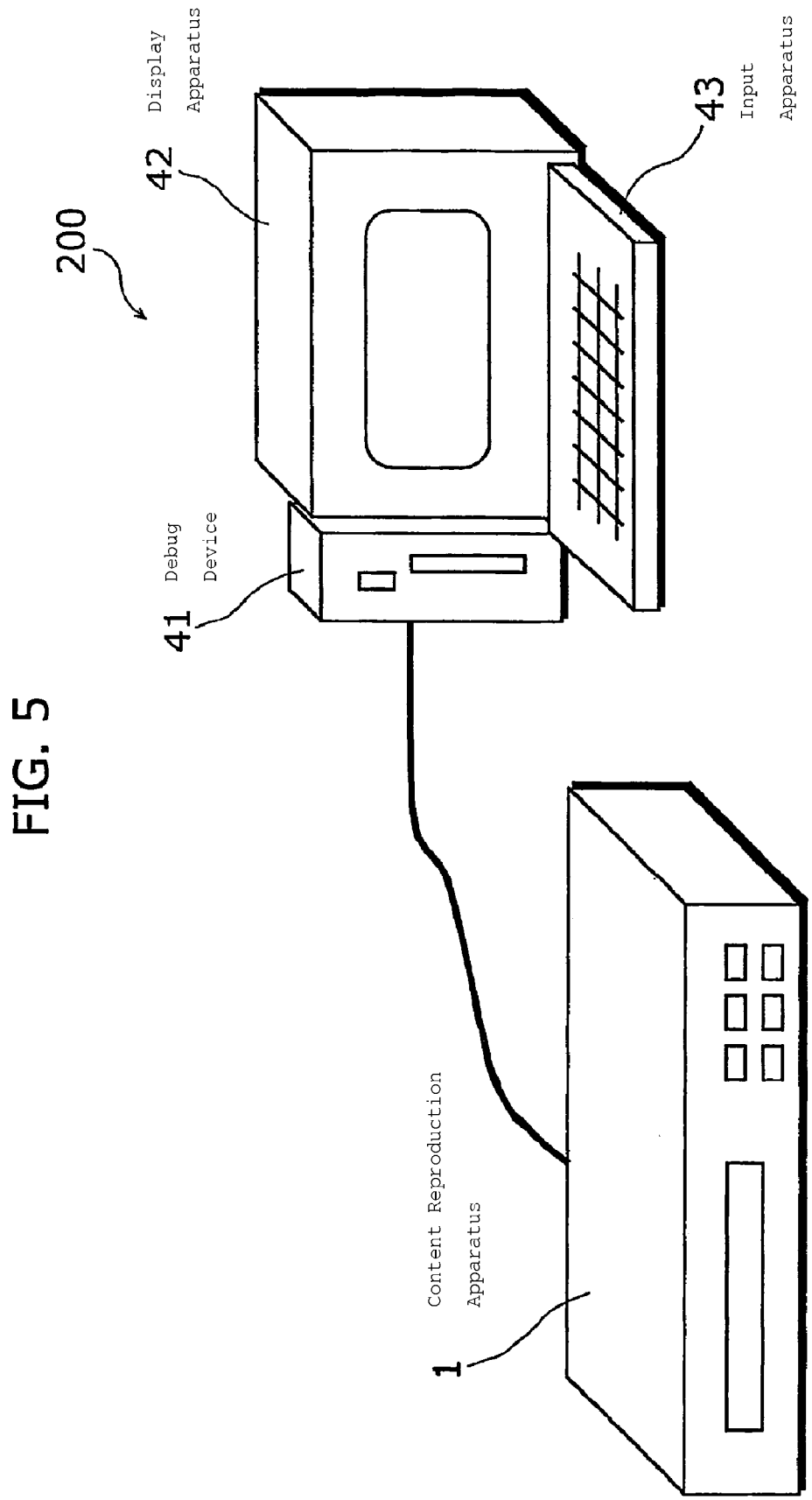
FIG. 5 is an outside drawing showing a structure of a content reproduction system according to a second embodiment of the present invention.

FIG. 5 is an outside drawing showing a structure of the content reproduction system 200 according to the second embodiment of the present invention.

The content reproduction system 200 includes a content reproduction apparatus 1, a debug apparatus 41, a display apparatus 42, and an input apparatus 43.

The content reproduction apparatus 1 has a similar configuration as that of the content reproduction apparatus 1 shown in the first embodiment. Therefore, the detailed explanation about the structure is not repeated in here.

The debug apparatus 41 is an apparatus for debugging a program and the like stored in the content reproduction apparatus 1. The display apparatus 42 is an apparatus which receives an output from the debug apparatus 41 and displays the output on a screen. The input apparatus 43 is an apparatus for inputting the input received from an operator of the debug apparatus 41 to the debug apparatus 41.

Here, the debug apparatus 41 is same as the debug apparatus used in a development of the content reproduction apparatus 1. The content reproduction apparatus 1 and the debug apparatus 41 have debug terminals, for example, such as JTAG and these terminals are connected to each other by a connection cable corresponding to a terminal for connecting debug apparatus such as the JTAG cable. Further, the debug apparatus 41 and the display apparatus 42, and the debug apparatus 41 and the input apparatus 43 respectively connected to each other through a connection cable corresponding to a debug terminal used in the debug apparatus 41.

Figure 6:
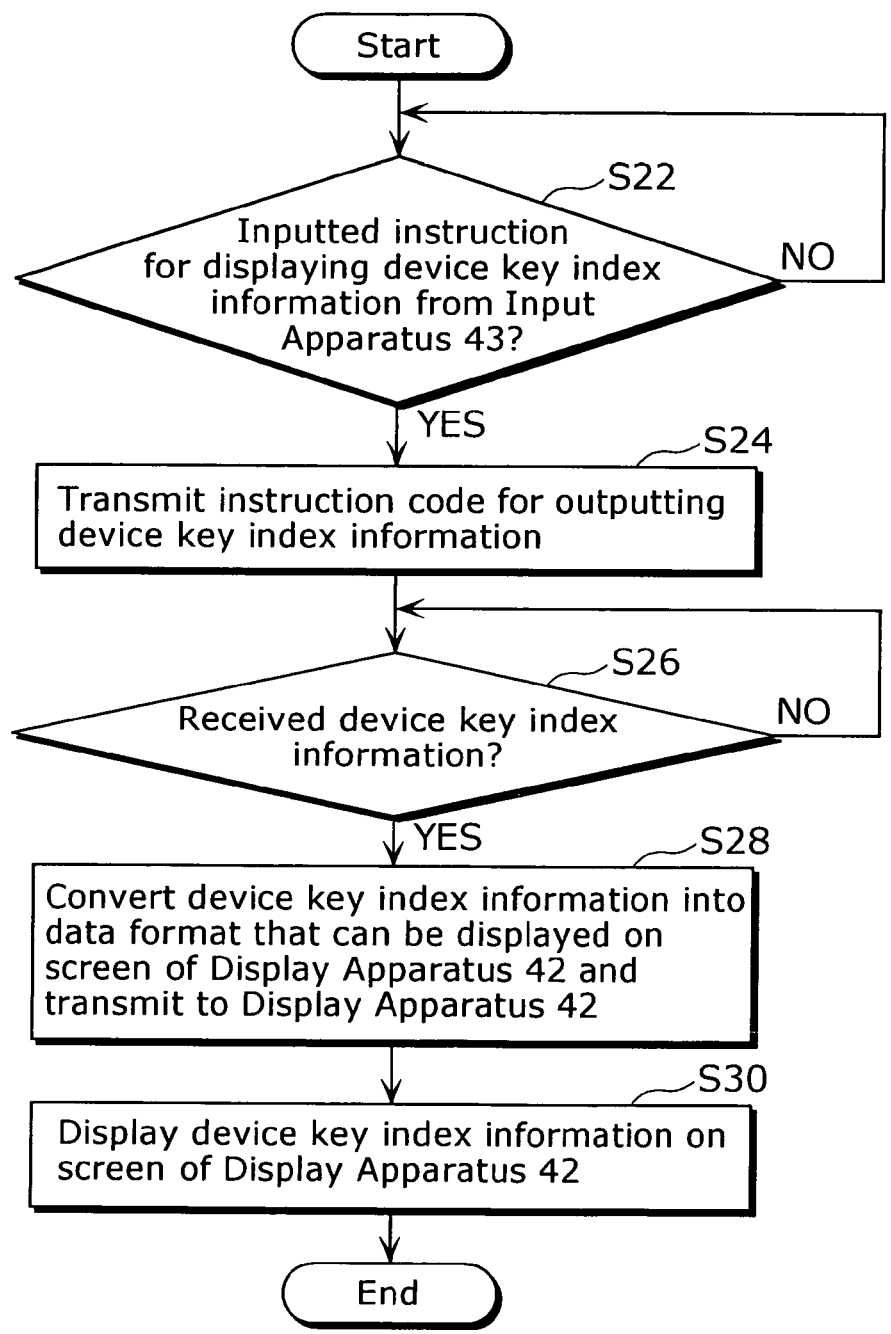
FIG. 6 is a flowchart showing a process executed by a debug apparatus.
Figure 7:
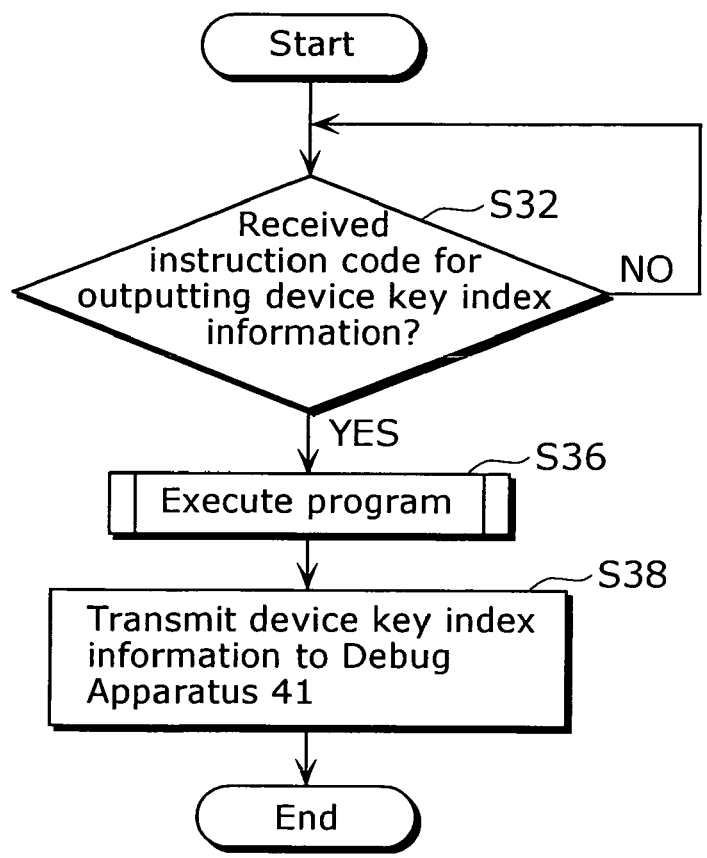
FIG. 7 is a flowchart showing a process executed by a content reproduction apparatus.

Next, in the content reproduction system 200 according to the present embodiment, it is explained about a process of outputting the device key index information 19*a* stored in the content reproduction apparatus 1 to the outside. FIG. 6 is a flowchart showing a process executed by the debug apparatus 41. FIG. 7 is a flowchart showing a process executed by the content reproduction apparatus 1.

The operator of the debug apparatus 41 starts the debug apparatus 41 in a state where it is connected to the content reproduction apparatus 1. Next, the operator inputs an instruction for displaying the device key index information 19*a* in the content reproduction apparatus 1 into the debug apparatus 41 using the input apparatus 43.

As shown in FIG. 6, when the instruction is inputted from the input apparatus 43 (YES at S22), the debug apparatus 41 transmits a predetermined instruction code for outputting the device key index information 19*a* to the content reproduction apparatus 1 (S24).

In the case of receiving the device key index information 19*a* from the content reproduction apparatus 1 (YES at S26), the debug apparatus 41 converts the received device key index information 19*a* into a data format which can be displayed on a screen of the display apparatus 42 and transmits to the display apparatus 42 (S28). The display apparatus 42 displays the received device key index information 19*a* after the data conversion on the screen (S30).

Next, it is explained about a process executed by the content reproduction apparatus 1. As shown in FIG. 7, when the instruction code receiving unit 13*a* of the debug external I/F 13 receives the predetermined instruction code transmitted by the debug apparatus 41 (YES at S32), the device key index information obtainment processing unit 10*a* executes the device key index information obtainment processing program 111*a* stored in the PAM 18 (S36). After that, the device key index information obtainment processing unit 10*a* transmits the device key index information 19*a* to the debug apparatus 41 (S38).

The process executed by the device key index information obtainment processing unit 10*a* (S36) is same as what is explained with reference to FIG. 4. Therefore, the detailed explanation about the process is not repeated in here.

As explained in the above, according to the second embodiment, the following effect specific to the second embodiment is performed in addition to the effect indicated in the first embodiment.

That is, according to the content reproduction system 200 in the second embodiment, the device key index information 19*a* can be displayed to the display apparatus 42 of the debug apparatus 41 using a debug interface for a development of the content reproduction apparatus 1 as it is. Therefore, there is a merit that a specific interface for obtaining the device key index information 19*a* is not necessarily set in the content reproduction apparatus 1.

In addition, using an interface for debug, it can be prevented a debug apparatus for a development of a content reproduction apparatus, general user without having a debug environment and the like from browsing the device key index information 19*a* without permission.

Third Embodiment

A content reproduction system according to the third embodiment of the present invention differs with the content reproduction system 100 in the first embodiment and the content reproduction system 200 in the second embodiment. It is a system of not only reproducing digital contents, but also displaying the device key index information only when an authentication by a server which is described later is performed.

Figure 8:
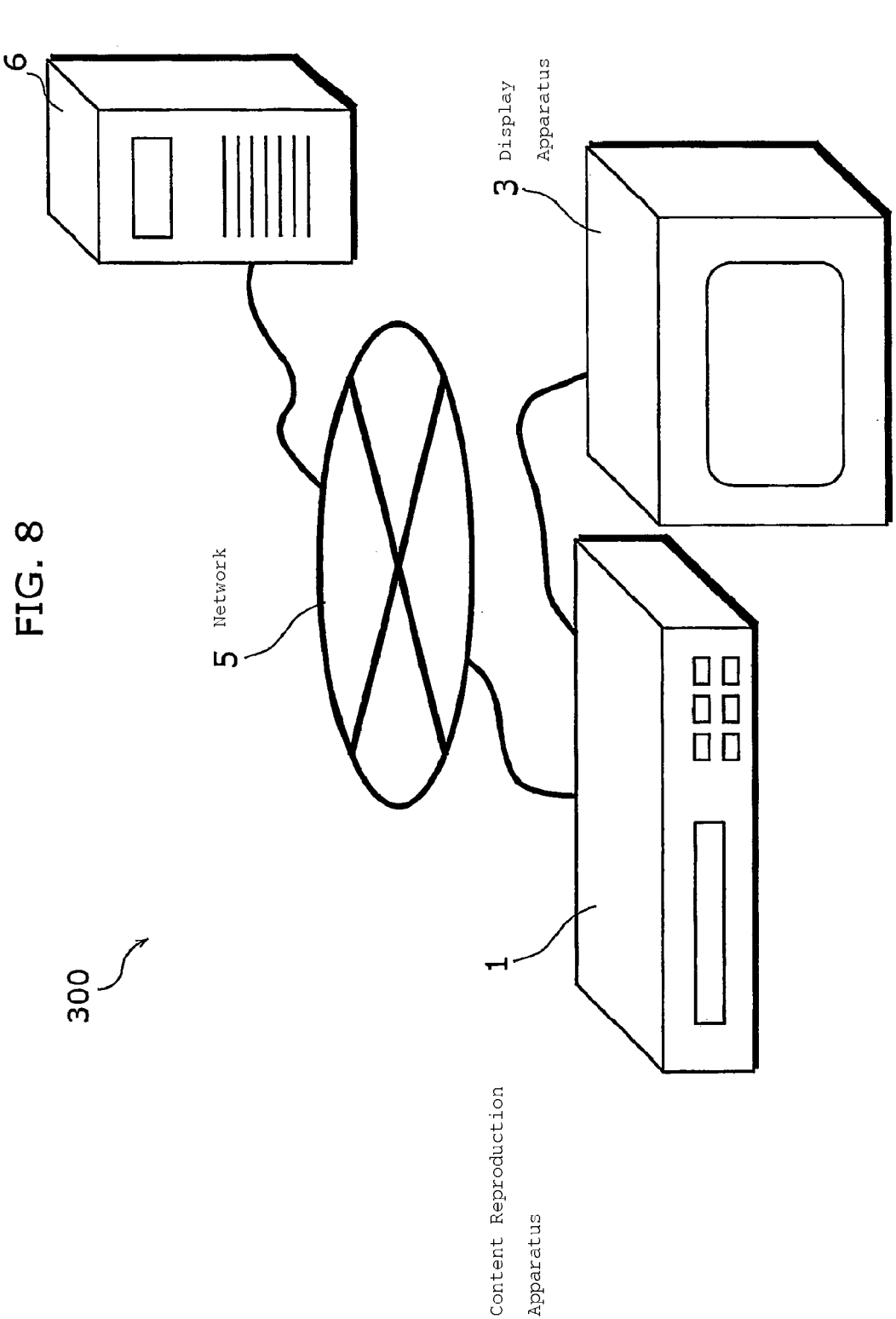
FIG. 8 is an outside drawing showing a structure of the content reproduction system according to a third embodiment of the present invention.

FIG. 8 is an outside drawing showing a structure of a content reproduction system 300 according to the third embodiment of the present invention. The content reproduction system 300 includes a content reproduction apparatus 1, a display apparatus 3 and a server 6. The content reproduction apparatus 1 and the server 6 are connected to each other via a network 5 such as the Internet.

The content reproduction apparatus 1 and the display apparatus 3 respectively have same structures as those of the content reproduction apparatus 1 and display apparatus 3 shown in the first embodiment. Therefore, the detailed explanation about the same structures is not repeated in here.

The server 6 is an apparatus of transmitting an instruction code for outputting the device key index information 19*a* stored in the content reproduction apparatus 1 to the content reproduction apparatus 1 which performed user authentication.

The content reproduction apparatus 1 has a communication I/F 14 for connecting to the network 5. Specifically, a LAN terminal and the like are envisioned.

Figure 9:
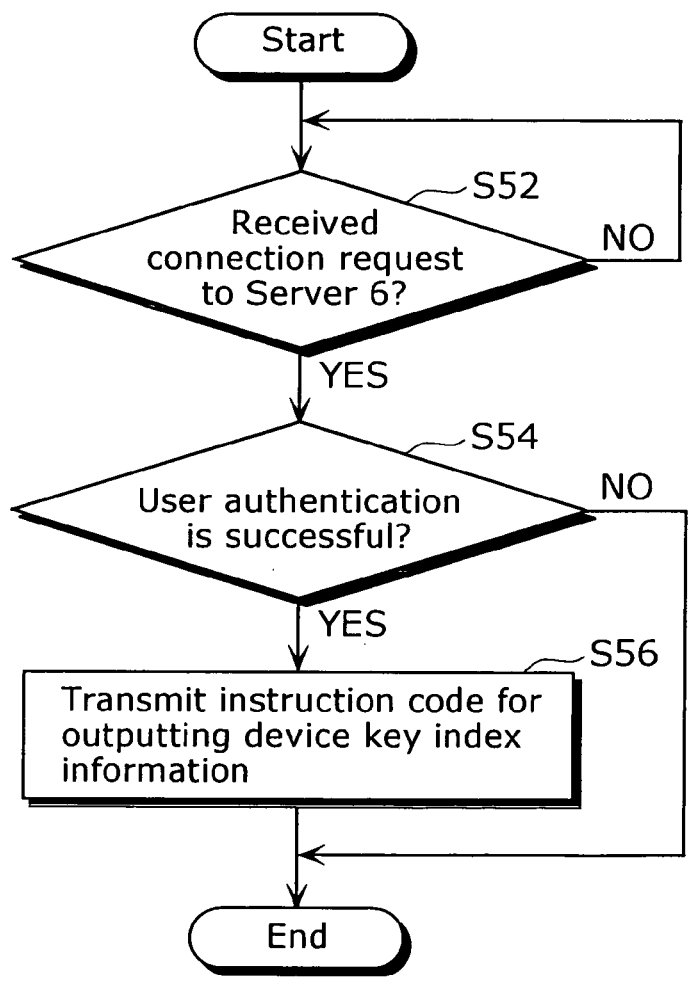
FIG. 9 is a flowchart showing a process executed by a server.
Figure 10:
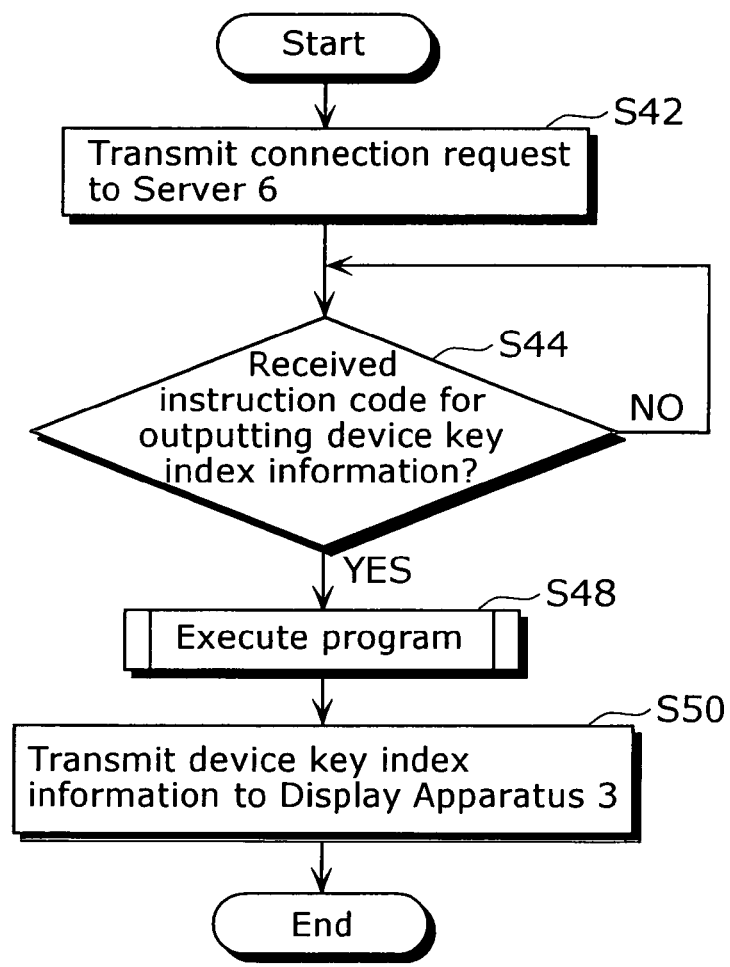
FIG. 10 is a flowchart showing a process executed by the content reproduction apparatus.

Next, in the content reproduction system 300 in the present embodiment, it is explained about a process of outputting the device key index information 19*a* stored in the content reproduction apparatus 1. FIG. 9 is a flowchart showing a process executed by the server 6. FIG. 10 is a flowchart showing a process executed by the content reproduction apparatus 1.

As shown in FIG. 9, the server 6 judges whether a connection request from the content reproduction apparatus 1 to the server 6 is received or not (S52). Here, the content reproduction apparatus 1 transmits a name of a user who operates the content reproduction apparatus 1 and a password corresponding to the user name. The server 6 receives the user name and the password and judges that the connection request to the server 6 is received. In the case of receiving the connection request to the server 6 (YES at S52), the server 6 judges whether or not a user authentication is successful by judging whether the pair of the user name and the password included in the received connection request is previously registered at the server 6 (S54). That is, the server 6 judges that the user authentication is successful when the pair of the user name and the password is previously registered at the server 6. Here, the pair of the user name and the password registered at the server 6 is a pair of a user name and a password of those who has an authority of executing displaying the device key index information.

When the user authentication is successful (YES at S54), the server 6 transmits an instruction code for outputting the device key index information 19*a* to the content reproduction apparatus 1 via the network 5 (S56) and terminates the process. When the user authentication is failed (NO at S54), the server 6 terminates the process without transmitting the instruction code.

Next, it is explained about a process executed by the content reproduction apparatus 1. The operator of the content reproduction apparatus 1 performs predetermined operations on the content reproduction apparatus 1 and displays a content reproduction apparatus maintenance menu (not shown in the diagram) to the display apparatus 3 in order to obtain the device key index information 19a embedded in the content reproduction apparatus 1. For example, the content reproduction maintenance menu may be displayed to the display apparatus 3 by setting a switch (not shown in the diagram) specific to transfer to a maintenance mode on a body of the content reproduction apparatus 1 and pushing the switch by the operator.

The operator selects a menu of "executing process of obtaining device key index information". Herein, the menu selecting operation by the operator may be performed using an operation button (not shown in the diagram) set on the body of the content reproduction apparatus 1 or using a remote controller (not shown in the diagram) attached to the content reproduction apparatus 1.

After selecting the menu, the operator inputs a user name and a password. When the operator inputs the user name and the password, the main processing unit 10 of the content reproduction apparatus 1 transmits the user name and the password via the communication I/F 14 and the network 5 to the server 6 and transmits the connection request to the server 6 (S42).

When the user authentication is successful in the server 6, as described above, an instruction code for outputting the device key index information 19a is transmitted from the server 6 (S 56 in FIG. 10). Accordingly, when the instruction code receiving unit 14a of the communication interface I/F 14 receives the instruction code transmitted from the server 6 (YES at S44), the device key index information obtainment processing unit 10a executes the device key index information obtainment processing program 111a stored in the RAM 18 (S48).

The device key index information output processing unit 11a converts the device key index information 19a obtained by the process (S48) into a data format which can be displayed to the display apparatus 3 in the video processing unit 11. After that, the converted device key index information 19a is displayed to the display apparatus 3 via a connection cable (not shown in the diagram) connecting to the video output unit 12 and the display apparatus 3 (S50).

The process executed by the device key index information obtainment processing unit 10a (S48) is same as what is explained with reference to FIG. 4. Therefore, the detailed explanation about the process is not repeated in here.

As explained in the above, according to the third embodiment, there is a following unique effect in addition to the effect according to the first embodiment.

That is, according to the content reproduction system 300 in the third embodiment, for example, in the case of where a DVD recorder having a communication interface for performing update of EPG information and a recording reservation via the network is used as the content reproduction apparatus 1, using the communication I/F 14, there is a merit that an interface specific for obtaining the device key index information 19a is unnecessary to be set.

Also, the server 6 authenticates whether the operator of the content reproduction apparatus 1 has an authority of browsing the device key index information or not. Therefore, it can prevent an operator without the authority from browsing the device key index information without permission.

Fourth Embodiment

A content reproduction system according to a fourth embodiment of the present invention differs with the content reproduction systems 100 to 300 respectively accordingly to the first to third embodiments. It is a system, in addition of reproducing digital contents, of displaying device key index information to a display apparatus connected to a computer terminal apparatus connected to a network.

Figure 11:
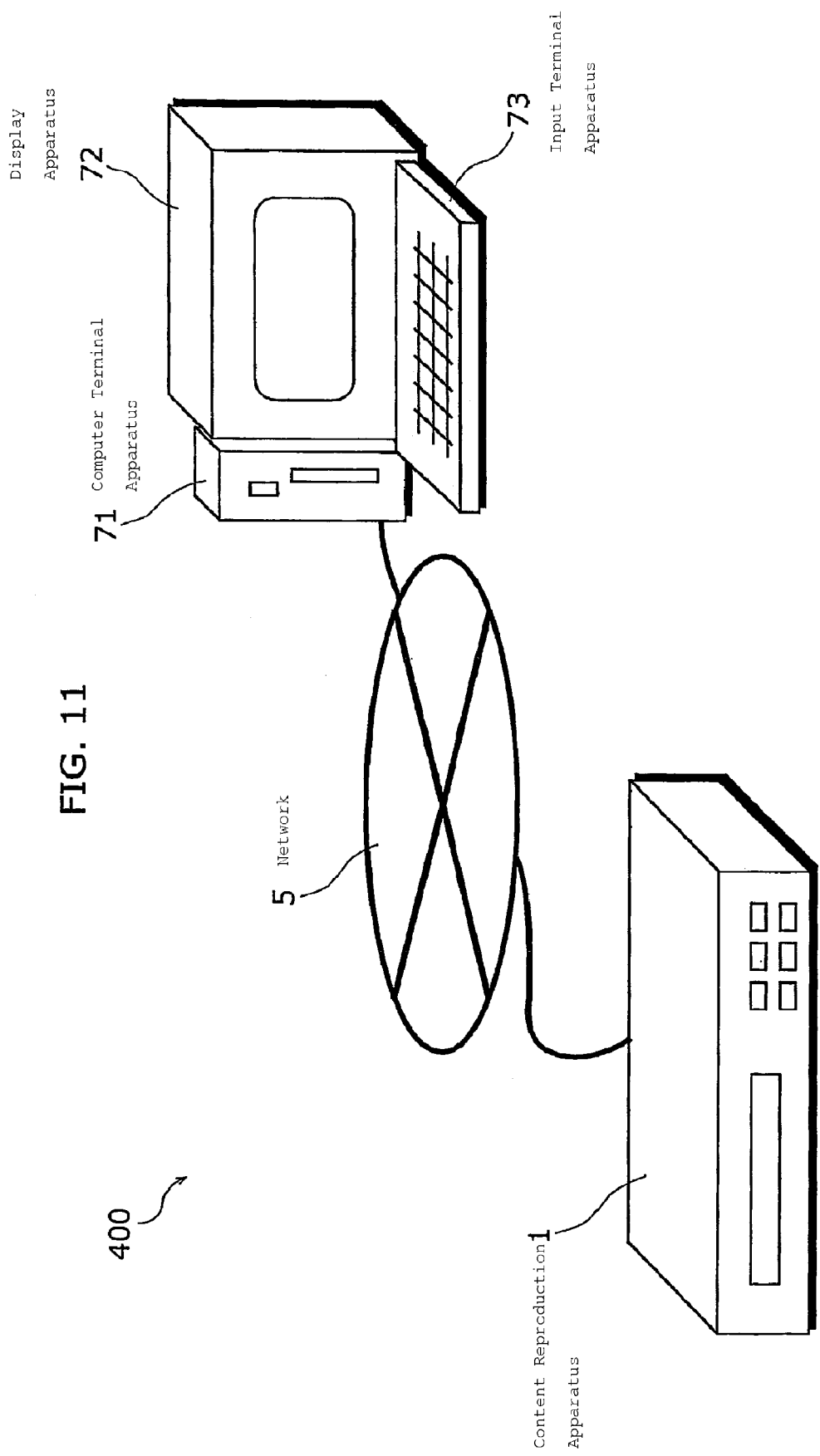
FIG. 11 is an outside drawing showing a structure of a content reproduction system according to a fourth embodiment of the present invention.

FIG. 11 is an outside drawing showing a structure of a content reproduction system 400 according to the fourth embodiment of the present invention. The content reproduction system 400 includes a content reproduction apparatus 1, a computer terminal apparatus 71, a display apparatus 72 and an input terminal apparatus 73. The content reproduction apparatus 1 and the computer terminal apparatus 71 are connected to each other via a network 5 such as a LAN.

The content reproduction apparatus 1 has a same configuration as the content reproduction apparatus 1 shown in the first embodiment. Therefore, the detailed explanation is not repeated in the description of the fourth embodiment.

The computer terminal apparatus 71 is an ordinary computer terminal apparatus. The display apparatus 72 is an apparatus showing display information outputted from the computer terminal apparatus 71 to a screen. The input terminal apparatus 73 is an apparatus which inputs data to the computer terminal apparatus 71.

The content reproduction apparatus 1 and the computer terminal apparatus 71 have an interface for connecting to the network 5. Specifically, it is envisioned to be a LAN terminal and the like. Also, a program for monitoring device key index information 19a in the content reproduction apparatus 1 is installed in the computer terminal apparatus 71.

Figure 12:
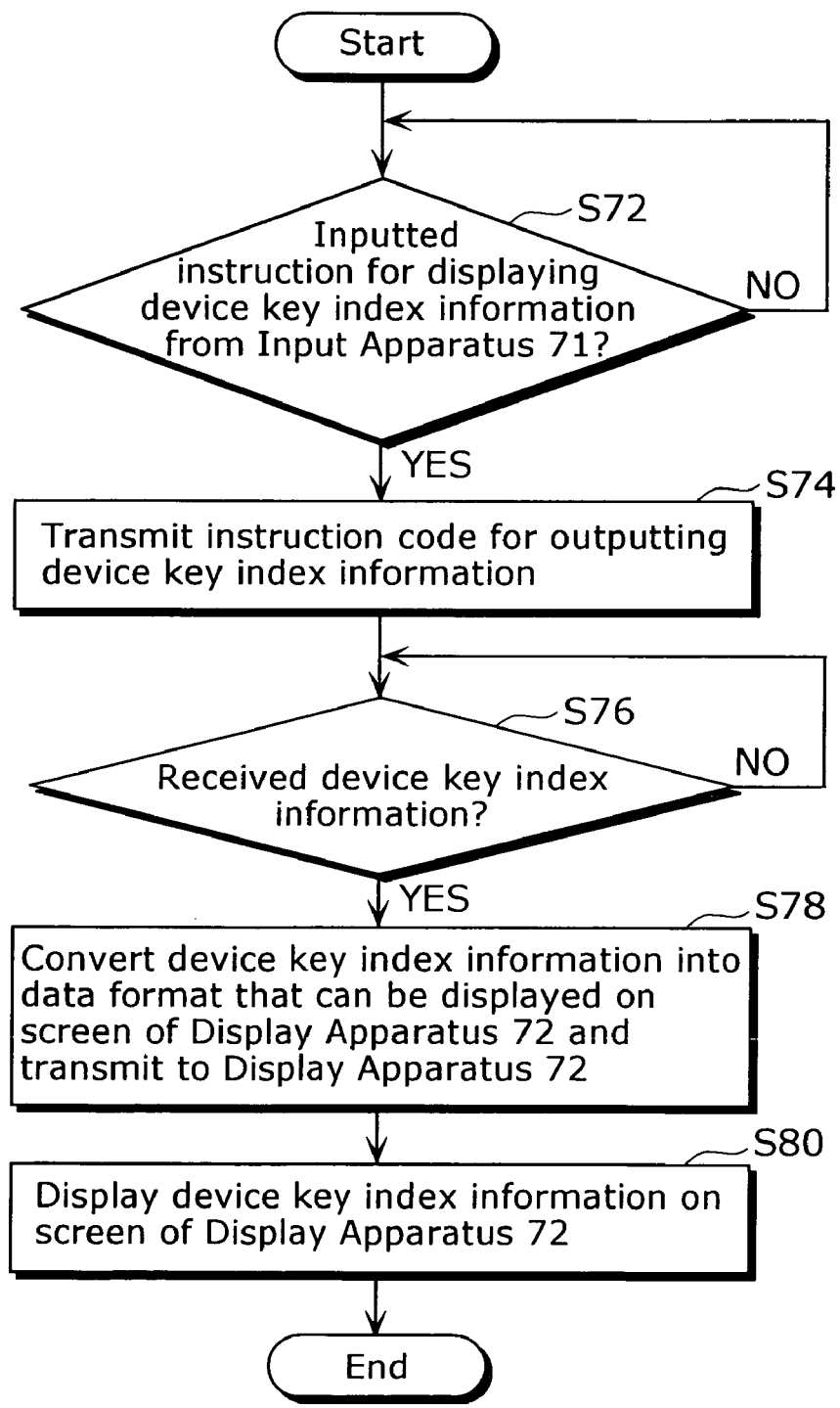
FIG. 12 is a flowchart showing a process executed by a computer terminal apparatus.
Figure 13:
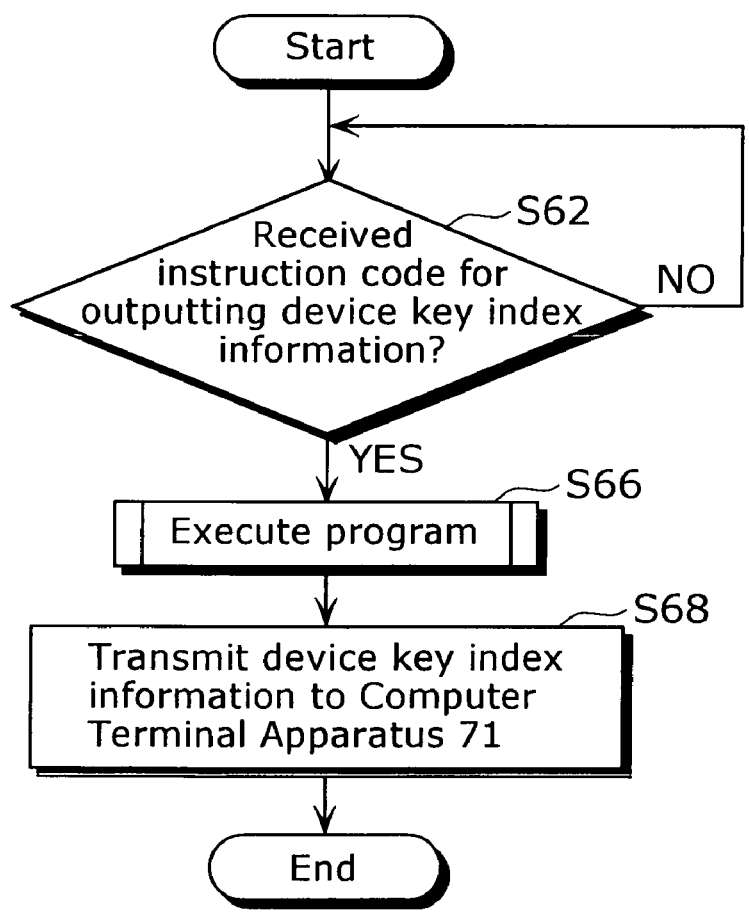
FIG. 13 is a flowchart showing a process executed by a content reproduction apparatus.

Next, in the content reproduction system 400 according to the present embodiment, a process of outputting the device key index information 19a stored in the content reproduction apparatus 1 is explained. FIG. 12 is a flowchart showing processes executed by the computer terminal apparatus 71. FIG. 13 is a flowchart showing a process executed by the content reproduction apparatus 1.

First, in a state where the content reproduction apparatus 1 and the computer terminal apparatus 71 are connected to each other via the network 5, an operator of the content reproduction apparatus 1 turns power of the content reproduction apparatus 1 on and transfers, from a program storage unit 111 to a RAM 18, a device key index information obtainment processing program 111a for monitoring the device key index information 19a.

Next, the operator of the computer terminal apparatus 71 inputs, using the input terminal apparatus 73, an instruction for displaying the device key index information 19a to the computer terminal apparatus 71.

Responding to the input of the instruction (YES at S72), the computer terminal apparatus 71 transmits an instruction code for displaying the device key index information 19a to the content reproduction apparatus 1 via the network 5 (S74).

When the computer terminal apparatus 71 receives the device key index information 19a from the content reproduction apparatus 1 (YES at S76), it converts the received device key index information 19a into a data format which can be displayed on a screen of the display apparatus 72 and transmits to the display apparatus 72 (S78). The display apparatus 72 displays the received device key index information 19a after data conversion on the screen (S80).

Next, a process executed by the content reproduction apparatus 1 is explained. As shown in FIG. 13, when an instruction code receiving unit 13a of a debug external I/F 13 receives the predetermined instruction code transmitted from the computer terminal apparatus 71 (YES at S62), a device key index information obtainment processing unit 10a executes the device key index information obtainment processing program 111a stored in the RAM 18 (S66). After that, the device key index information obtainment processing unit 10*a* transmits the device key index information 19*a* to the computer terminal apparatus 71 (S68).

The process executed by the device key index information obtainment processing unit 10*a* (S68) is same as what is explained with reference to FIG. 4. Therefore, the detailed explanation about the same process is not repeated in here.

As explained in the above, the fourth embodiment has a following effect in addition to the effect shown in the first embodiment.

That is, according to the content reproduction system 400 in the fourth embodiment, for example, when a DVD recorder and the like having a communication interface for updating EPG information and making a reservation for recording via the network are used as the content reproduction apparatus 1, there is a merit that a special interface for obtaining the device key index information 19*a* is unnecessary to be set using the communication I/F 14.

As explained in the above, according to the first to fourth embodiments of the present invention, device key index information 19*a* unique to the content reproduction apparatus 1 can be displayed in some ways. Also, as explained in the above, the device key index information 19*a* is in a one-to-one association with the device key 110*a*. Therefore, personnel of the content reproduction apparatus manufacturer and a licensor can know about which device key 110*a* is embedded in the content reproduction apparatus 1 by examining the displayed device key index information 19*a*.

Accordingly, the personnel of the content reproduction apparatus manufacturer can know whether the device key embedded in the content reproduction apparatus 1 is revoked or not by examining the device key index information 19*a*.

Also, the licensor can verify whether or not a same device key 110*a* is embedded in the plurality of the content reproduction apparatuses 1 by examining whether the same device key index information 19*a* is not used in the plurality of the content reproduction apparatuses 1.

In the above, it is explained about the content reproduction system according to the present invention based on the embodiment. However, the present invention is not limited to the context of this embodiment.

For example, in the embodiment, the device key index information 19*a* is encrypted and stored in the device key storage unit 110. However, it may be stored without the encryption. In this case, data read out from the device key storage unit 110 may be outputted to outside as they are when the device key index information 19*a* is outputted to the outside.

Also, in the embodiment, the encrypted device key index information 19*a* is outputted to the outside after being decrypted at the cryptographic processing unit 17. However, the encrypted device key index information may be outputted to the outside as they are. In this case, it is assumed that a master key 17*a* for decrypting the encrypted device key index information is not stored in the cryptographic processing unit 17.

Each apparatus which receives the encrypted device key index information from the content reproduction apparatus 1 stores a key for decryption and may obtain the device key index information 19*a* by decrypting the encrypted device key index information.

Also, the encrypted device key index information 19*a* may be displayed to each display apparatus as they are. Further, each display apparatus may display the device key index information 19*a* which is decrypted by the cryptographic processing unit 17 and is further encrypted with another key.

The pieces of encrypted device key index information obtained by encrypting the same pieces of device key index information even have a same value. Therefore, the licensor can verify whether or not the same device key 110*a* is embedded in the plurality of the content reproduction apparatuses 1 by examining whether or not the same encrypted device key index information is used by the plurality of the content reproduction apparatuses 1.

Furthermore, a key for decrypting the encrypted device key index information is secretly held by a manufacturer of each content reproduction apparatus so that the manufacturer only may be allowed to know the device key index information 19*a*. Consequently, the manufacturer which manufactured the content reproduction apparatus only can know the device key index information 19*a*.

Also, the present invention in the first embodiment provides a structure in which the optical disc 2 is inserted into the content reproduction apparatus 1. However, it may be a semiconductor recording media such as a SD memory card or a memory stick, an IC card and the like.

Further, in the first embodiment of the present invention, the following mechanism may be added in order to prevent a general user from creating an optical disc holding a program for displaying the device key index information 19*a*, and browsing the device key index information 19*a* in the content reproduction apparatus.

First, an ID unique to each optical disc 2 is written in a ROM area of the disc when the disc is manufactured. For example, in the case of DVD, an ID may be written in a Burst Cutting Area (BCA). Then, an instruction code for displaying the device key index information 19*a* is executed by the content reproduction apparatus 1 only in the case where a disc having a specific ID is inserted. The optical disc 2 having this specific ID is not commercially available but only a development manufacturer of the content reproduction apparatus can obtain as a disc for maintenance.

Consequently, even if general user can create a program for displaying the device key index information 19*a*, he/she cannot obtain the disc for maintenance. Therefore, the device key index information 19*a* in the content reproduction apparatus 1 cannot be browsed.

Suppose if the program stored in the disc for maintenance is copied, an ID of the optical disc 2 differs with an ID of a disc of the copying destination. Also, the ID of the copying destination does not have authority of issuing an instruction. Therefore, the content reproduction apparatus 1 can make the program unavailable.

Additionally, in the case where the manufacturer of the content reproduction apparatus whose licensor of the copyright protection method is a licensee applies the structure of the present invention for a purpose of verifying whether a device key 110*a* which is unique to a content reproduction apparatus is correctly embedded, the device key index information obtainment processing program 111*a* and the like for outputting the described device key index information 19*a* to the outside may be enforced to be implemented in the content reproduction apparatus by a license and the like. However, following problems remain.

That is, it is a malpractice that, whereas the device key index information obtainment processing program 111*a* itself is implemented, the device key index information 19*a* outputted by executing the device key index information obtainment processing program 111*a* differs with what is actually embedded.

Specifically, whereas the same device key 110*a* and the device key index information 19*a* are embedded in the plurality of the content reproduction apparatuses 1, each of the content reproduction apparatuses responds to the received instruction code and can work a malpractice such as outputting false device key index information 19a which differs for each of the content reproduction apparatuses. Such malpractice can cause the licensor to think that a unique device key 110a is embedded in each of the content reproduction apparatuses 1. This malpractice can be prevented as follows.

Defining the device key index information 19a is DI, a check information P=F(DI) is obtained by performing a secret conversion F about which only the licensor knows. As for F, for example, a cryptographic process of a secret key cryptographic method in which a key is secret except for the licensor can be used. When the licensor issues a device key 110a to the content reproduction apparatus manufacturer that is the licensee, the licensor issues the check information P in addition to the device key 110a and the device key index information 19a (DI). The licensee is enforced to implement a program for combining and displaying the device key index information 19a (DI) and the check information P in the content reproduction apparatus by a license and the like.

Consequently, even if the licensee creates false device key index information 19a, it cannot forge the corresponding check information P. Therefore, even if the content reproduction apparatus 1 outputs the false device key index information 19a (DI), it can be detected as the forged device key index information by examining whether or not a pair of the device key index information 19a (DI) and the check information P establishes a relationship of P=F(DI).

Also, the check information may be digital signature data using a public key cryptographic method. That is, a digital signature is created using a secret signature key of a licensor for the device key index information 19a (DI) as the check information P. The check information P which is created as described above may be checked using a public signature verification key corresponding to the signature key of the licensor.

Also, in this method, the licensor may issue, for the licensee, when the conversion F is disclosed to the licensee, together with the device key 110a, data which the check information P or data combining the device key information DI to the check information P are encrypted with a secret key about which the licensor only knows, and output the encrypted data together with the device key index information 19a. Further, a program for outputting the encrypted data instead of the device key index information 19a may be enforced to be implemented in the content reproduction apparatus 1. In this case, the licensor can obtain the encrypted data from the content reproduction apparatus using the program and verify whether the device key index information 19a is forged or not from the data obtained by decrypting the encrypted data with the secret key of the licensor. Here, the check information P is stored in the content reproduction apparatus.

Figure 14:
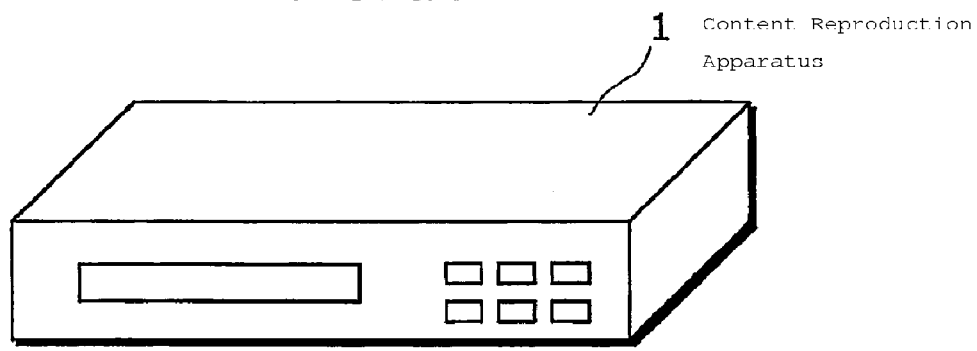
FIG. 14 is an outside drawing of the content reproduction apparatus.
Figure 15:
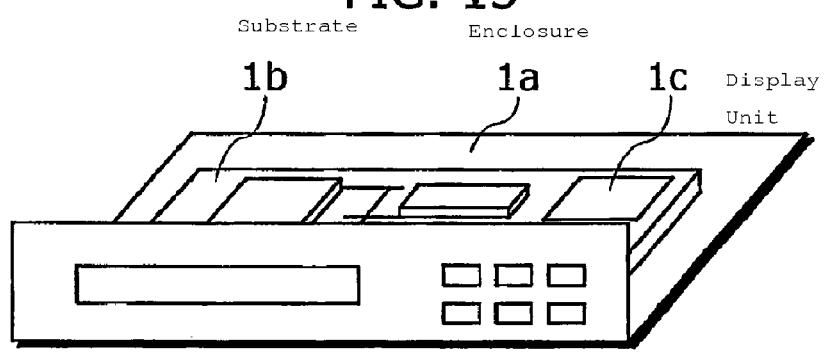
FIG. 15 is a drawing showing when a cover of the content reproduction apparatus shown in FIG. 14 is removed.

Further, the device key index information 19a may be directly written in the enclosure of the content reproduction apparatus 1 instead of being displayed to the display apparatus and the like. FIG. 14 is an outside drawing of the content reproduction apparatus 1. FIG. 15 is a drawing showing the content reproduction apparatus 1 when its cover is removed. The content reproduction apparatus 1 includes an enclosure 1a, a substrate 1b and a device key index information display unit 1c.

Figure 16:
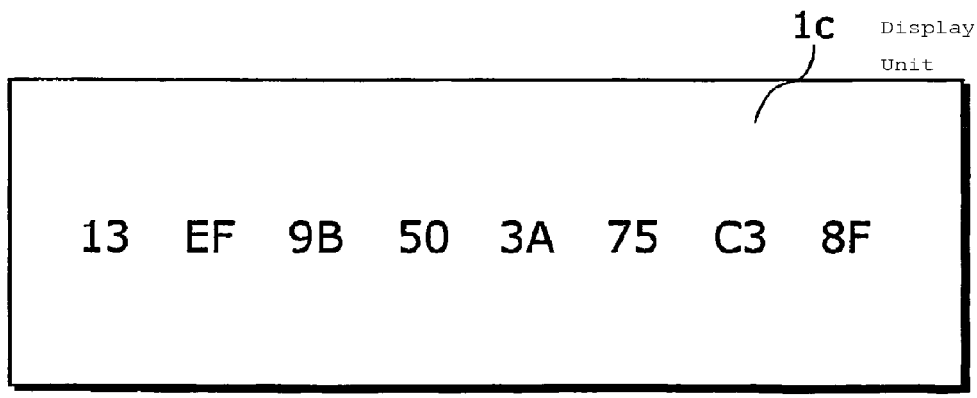
FIG. 16 is a diagram showing an example of a device key index information display unit.

FIG. 16 is a diagram showing an example of the device key index information display unit 1c. In the device key index information display unit 1c, numeric values indicating the device key index information 19a in the content reproduction apparatus 1 in hexadecimal numbers are described. The numeric values may be directly printed by a printing method such as laser printing, or be a board on which the device key index information 19a is printed that is attached by an adhesive method such as vises, adhesives, welding or the like. Specifically, for example, the value indicating, in hexadecimal numbers, the decryption information Iu disclosed in the relevant literature may be described.

The cover of the content reproduction apparatus 1 may be held with screws, vises and the like in special shapes so that a general user cannot remove the cover. Furthermore, a place where the index information is displayed is not limited to the mentioned place and can be anywhere unless it can tell the index information of the content reproduction apparatus 1.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The content reproduction apparatus according to the present invention has an effect that can obtain information (device key index information) relating to an individual key (device key) of the content reproduction apparatus embedded in the content reproduction apparatus by receiving an instruction from outside. For example, it is effective for a content reproduction apparatus and the like having a copyright protection function and holding secret information unique to each content reproduction apparatus.

The invention claimed is:

1. A content reproduction apparatus which reproduces a digital content, the content reproduction apparatus comprising:
   a secret information storage unit including a memory operable to store a device key, the device key corresponding to the content reproduction apparatus, and the device key being stored in the secret information storage unit such that the device key cannot be accessed from outside of the content reproduction apparatus;
   a cryptographic processing unit operable to decrypt an encrypted digital content corresponding to the digital content, the encrypted digital content being encrypted using the device key stored in the secret information storage unit;
   an index information storage unit operable to store index information, the index information indicating the device key stored in the secret information storage unit, and the index information being stored in the index information storage unit such that the index information is accessed from outside of the content reproduction apparatus;
   a video output unit operable to connect to a display apparatus that is distinct from the content reproduction apparatus;
   a user identification information transmission unit operable to transmit user identification information to a user authentication server located outside of the content reproduction apparatus, the user authentication server performing user authentication based on the user identification information received from the user identification information transmission unit, and the user authentication server transmitting an instruction for outputting the index information from the index information storage unit, based on a result of the authentication performed by the user authentication server;

an instruction receiving unit operable to receive, from the user authentication server, the instruction for outputting the index information from the index information storage unit;

a video processing unit operable to convert the index information stored in the index information storage unit into a data format that is displayable on a screen of the display apparatus; and an index information output unit operable to output, via the video output unit, only the index information converted by the video processing unit to cause the display apparatus to display the index information converted by the video processing unit, the index information converted by the video processing unit being output to the display apparatus based on the instruction received by the instruction receiving unit.

2. The content reproduction apparatus according to claim 1, wherein the index information stored in the index information storage unit is encrypted according to a predetermined cryptographic method, and wherein the index information output unit includes:

a decryption unit operable to decrypt, based on the instruction, the encrypted index information stored in the index information storage unit according to the predetermined cryptographic method; and an output unit operable to output the index information decrypted by the decryption unit to the display apparatus.

3. The content reproduction apparatus according to claim 1, wherein the index information stored in the index information storage unit is encrypted according to a predetermined cryptographic method, and wherein the index information output unit outputs, based on the instruction, the encrypted index information stored in the index information storage unit to the display apparatus.

4. The content reproduction apparatus according to claim 1, further comprising an authentication data storage unit operable to store authentication data that is obtained by performing a predetermined conversion on the index information.

5. The content reproduction apparatus according to claim 1, wherein the instruction receiving unit reads a program for executing the instruction, the program being read from a removable recording medium on which the program is recorded, and wherein the index information output unit outputs the index information stored in the index information storage unit to the display apparatus, the index information being output by executing the read program.

6. The content reproduction apparatus according to claim 5, wherein on the recording medium, a unique identification number is recorded, wherein the instruction receiving unit reads the program and the identification number from the removable recording medium on which the program is recorded, and wherein the index information output unit outputs, to the display apparatus, the index information stored in the index information storage unit, the index information being output by executing the read program only when the identification number satisfies a predetermined condition.

7. The content reproduction apparatus according to claim 1, wherein the instruction receiving unit is operable to receive the instruction from a communication terminal via a computer network.

8. The content reproduction apparatus according to claim 1, wherein the instruction receiving unit is operable to receive the instruction from a debug apparatus connected to the content reproduction apparatus.

9. The content reproduction apparatus according to claim 1, wherein the index information stored in the index information storage unit is encrypted according to a predetermined cryptographic method, and wherein the display apparatus displays the encrypted index information.

10. A content reproduction system which reproduces a digital content, the content reproduction system comprising:

a content reproduction apparatus which reproduces the digital content; and a user authentication server which performs user authentication, wherein the content reproduction apparatus includes:

a secret information storage unit including a memory operable to store a device key, the device key corresponding to the content reproduction apparatus, and the device key being stored in the secret information storage unit such that the device key cannot be accessed from outside of the content reproduction apparatus;

a cryptographic processing unit operable to decrypt an encrypted digital content corresponding to the digital content, the encrypted digital content being encrypted using the device key stored in the secret information storage unit;

an index information storage unit operable to store index information, the index information indicating the device key stored in the secret information storage unit, and the index information being stored in the index information storage unit such that the index information is accessed from outside of the content reproduction apparatus;

a video output unit operable to connect to a display apparatus that is distinct from the content reproduction apparatus;

a user identification information transmission unit operable to transmit user identification information to the user authentication server;

an instruction receiving unit operable to receive, from the user authentication server, an instruction for outputting the index information from the index information storage unit;

a video processing unit operable to convert the index information stored in the index information storage unit into a data format that is displayable on a screen of the display apparatus; and an index information output unit operable to output, via the video output unit, only the index information converted by the video processing unit, the index information converted by the video processing unit being output to the display apparatus based on the instruction received by the instruction receiving unit, and wherein the user authentication server includes:
a user authentication unit operable to perform user authentication based on the user identification information received from the content reproduction apparatus; and
an instruction transmission unit operable to transmit the instruction to the content reproduction apparatus, based on a result of the authentication performed by the user authentication unit.

11. A method for controlling a content reproduction apparatus, the content reproduction apparatus storing a device key that corresponds to the content reproduction apparatus, the device key being stored in the content reproduction apparatus such that the device key cannot be accessed from outside of the content reproduction apparatus, the content reproduction apparatus decrypting an encrypted digital content using the stored device key to reproduce a digital content, the content reproduction apparatus storing index information that indicates the stored device key, and the index information being stored in the content reproduction apparatus such that the index information is accessed from outside of the content reproduction apparatus, and the content reproduction apparatus being connected to a display apparatus that is distinct from the content reproduction apparatus, the method comprising:
transmitting user identification information to a user authentication server located outside of the content reproduction apparatus, the user authentication server performing user authentication based on the user identification information received from the transmitting of the user identification information, and the user authentication server performing transmitting of an instruction for outputting the index information stored by an index information storage unit of the content reproduction apparatus, based on a result of the authentication performed by the user authentication server;
receiving, from the user authentication server, the instruction for outputting the index information from the index information storage unit of the content reproduction apparatus;
converting the stored index information into a data format that is displayable on a screen of the display apparatus, the stored index information being converted based on the received instruction; and
outputting only the converted index information to the display apparatus to cause the display apparatus to display the index information converted by the video processing unit.

12. A non-transitory computer-readable recording medium having a program recorded thereon, the program being used in a content reproduction apparatus, the content reproduction apparatus storing a device key that corresponds to the content reproduction apparatus, the device key being stored in the content reproduction apparatus such that the device key cannot be accessed from outside of the content reproduction apparatus, the content reproduction apparatus decrypting an encrypted digital content using the stored device key to reproduce a digital content, the content reproduction apparatus storing index information that indicates the stored device key, and the index information being stored in the content reproduction apparatus such that the index information is accessed from outside of the content reproduction apparatus, the content reproduction apparatus being connected to a display apparatus that is distinct from the content reproduction apparatus, and the program causing the content reproduction apparatus to execute a method comprising:
transmitting user identification information to a user authentication server located outside of the content reproduction apparatus, the user authentication server performing user authentication based on the user identification information received from the transmitting of the user identification information, and the user authentication server performing transmitting of an instruction for outputting the index information stored by an index information storage unit of the content reproduction apparatus, based on a result of the authentication performed by the user authentication server;
receiving, from the user authentication server, the instruction for outputting the index information from the index information storage unit of the content reproduction apparatus;
converting the stored index information into a data format that is displayable on a screen of the display apparatus, the stored index information being converted based on the received instruction; and
outputting only the converted index information to the display apparatus to cause the display apparatus to display the index information converted by the video processing unit.

* * * * *